(12) United States Patent
Tracy et al.

(10) Patent No.: US 7,920,374 B2
(45) Date of Patent: Apr. 5, 2011

(54) ANTI-OSCILLATION DEVICE FOR A NOTEBOOK DISPLAY

(75) Inventors: Mark S. Tracy, Tomball, TX (US); Earl W. Moore, Cypress, TX (US); Jeffrey A. Lev, Tomball, TX (US); Steven S. Homer, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 253 days.

(21) Appl. No.: 12/241,827

(22) Filed: Sep. 30, 2008

(65) Prior Publication Data
US 2010/0079931 A1    Apr. 1, 2010

(51) Int. Cl.
*G06F 1/16* (2006.01)

(52) U.S. Cl. .................... 361/679.02; 16/286

(58) Field of Classification Search ............. 361/679.02; 16/54, 286, 49
See application file for complete search history.

(56) References Cited

U.S. PATENT DOCUMENTS

| | | | | |
|---|---|---|---|---|
| 4,976,007 A * | 12/1990 | Lam | ................................ | 16/302 |
| 5,052,078 A * | 10/1991 | Hosoi | ............................ | 16/297 |
| 5,165,145 A * | 11/1992 | Sherman | ........................ | 16/341 |
| 5,173,837 A * | 12/1992 | Blackwell et al. | ........ | 361/679.28 |
| 5,348,519 A * | 9/1994 | Prince et al. | ....................... | 482/6 |
| 6,189,602 B1 * | 2/2001 | Tanahashi et al. | .............. | 165/86 |
| 6,266,238 B1 * | 7/2001 | Paulsel et al. | ............ | 361/679.27 |
| 6,925,684 B2 * | 8/2005 | Kang et al. | ....................... | 16/264 |
| 7,187,538 B2 * | 3/2007 | Homer et al. | ............ | 361/679.21 |
| 7,251,129 B2 * | 7/2007 | Lee et al. | ................. | 361/679.55 |
| 7,489,502 B2 * | 2/2009 | Hong et al. | ............. | 361/679.55 |
| 2005/0122671 A1 * | 6/2005 | Homer | ........................... | 361/681 |

OTHER PUBLICATIONS

ACE Controls, Inc. Rotary Dampers 2007 catalog.

* cited by examiner

*Primary Examiner* — Lisa Lea-Edmonds

(57) ABSTRACT

An anti-oscillation device for a notebook display can include a clutch housing and a dampening device connected to the shaft extension. The clutch housing can be configured to be connected to the display of the notebook and to a base of the notebook. The clutch housing can include a body and a shaft extension that extends from the body of the clutch housing.

10 Claims, 7 Drawing Sheets

US 7,920,374 B2

ANTI-OSCILLATION DEVICE FOR A NOTEBOOK DISPLAY

BACKGROUND

A conventional notebook computer, or notebook, includes a frame, which is sometimes referred to as a clam shell. The enclosure of the display for the notebook computer is hinged to a base enclosure, which includes the central processing unit, keyboard, and other components of the notebook computer, so that the notebook computer may be closed by rotating the display enclosure about the hinge. A user of the notebook computer may open the notebook computer by releasing a latch that holds the display enclosure and the base enclosure together. Once the latch is released the user may articulate the display enclosure to a desired viewing angle.

The hinge of the notebook computer can include a frictional device, such as a clutch, that provides the hinge with mechanical resistance so that the position of the display enclosure can be adjusted to any desired viewing angle and maintained at that position without the display enclosure falling or changing its angle.

However, when the latch is released and the display enclosure is moved to a desired viewing angle the display enclosure may oscillate or vibrate due to kinetic energy in the hinge of the notebook computer. Such oscillations or vibrations can be perceived by a user, such as by sight, sound, or feel, as a sign of poor quality.

SUMMARY

One embodiment of invention relates to an anti-oscillation device for a notebook display. The anti-oscillation device can include a clutch housing and a dampening device. The dampening device can be connected to the shaft extension. The clutch housing can be configured to be connected to the display of the notebook and to a base of the notebook. The clutch housing can include a body and a shaft extension that extends from the body of the clutch housing.

Another embodiment of invention relates to a notebook computer. The notebook computer can include a notebook computer, and an anti-oscillation device. The notebook computer can include a base and a display. The anti-oscillation device can include a clutch housing and a dampening device. The dampening device can be connected to the shaft extension. The clutch housing can be configured to be connected to the display of the notebook and to a base of the notebook. The clutch housing can include a body and a shaft extension that extends from the body of the clutch housing.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

DETAILED DESCRIPTION

Figure 1:
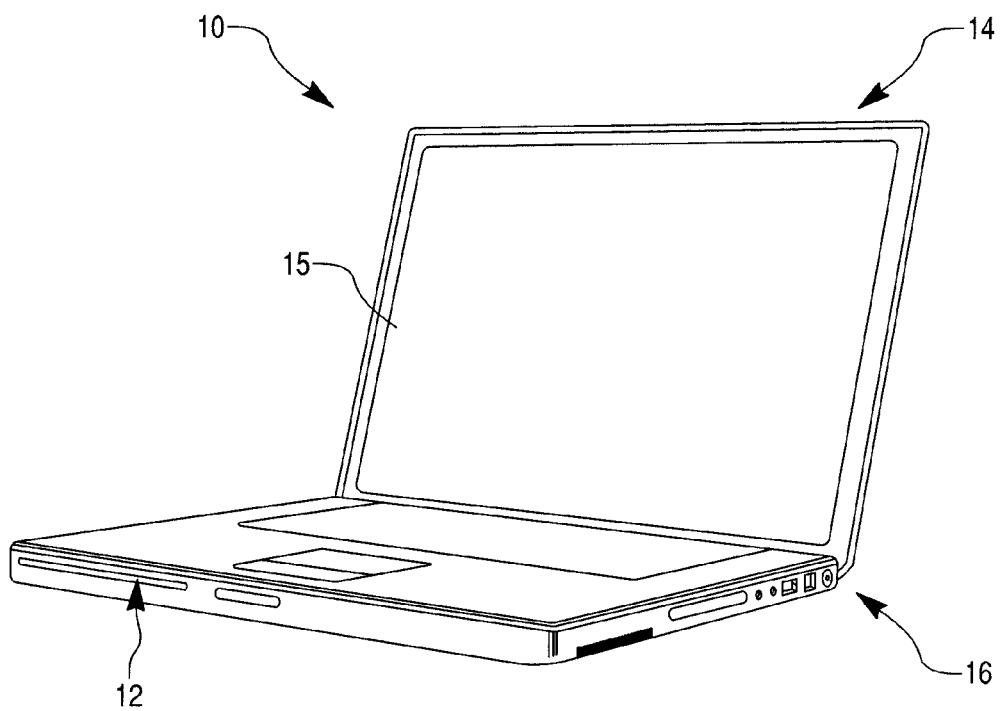
FIG. 1 is a isometric view of a notebook computer, according to an embodiment.

Presently preferred embodiments of the invention are illustrated in the drawings. In the drawings, an effort has been made to use like numerals to represent like parts.

It would be advantageous to provide a device that reduces, minimizes, or eliminates the oscillations or vibrations that can be experienced when the display enclosure of a notebook computer is moved to a viewing angle. Such an anti-oscillation device can be used, for example, to advantageously provide a smooth motion when opening or otherwise moving a display enclosure of a notebook computer to a viewing angle. Thus, a user of a notebook computer is provided with a feeling that the notebook computer is of good quality.

Referring to FIG. 1, an example of a notebook computer 10 is shown. The notebook computer 10 includes a base 12 and a display enclosure 14 for a display 15. The base 12 and display enclosure 14 are connected to one another at a hinge area 16.

Figure 2:
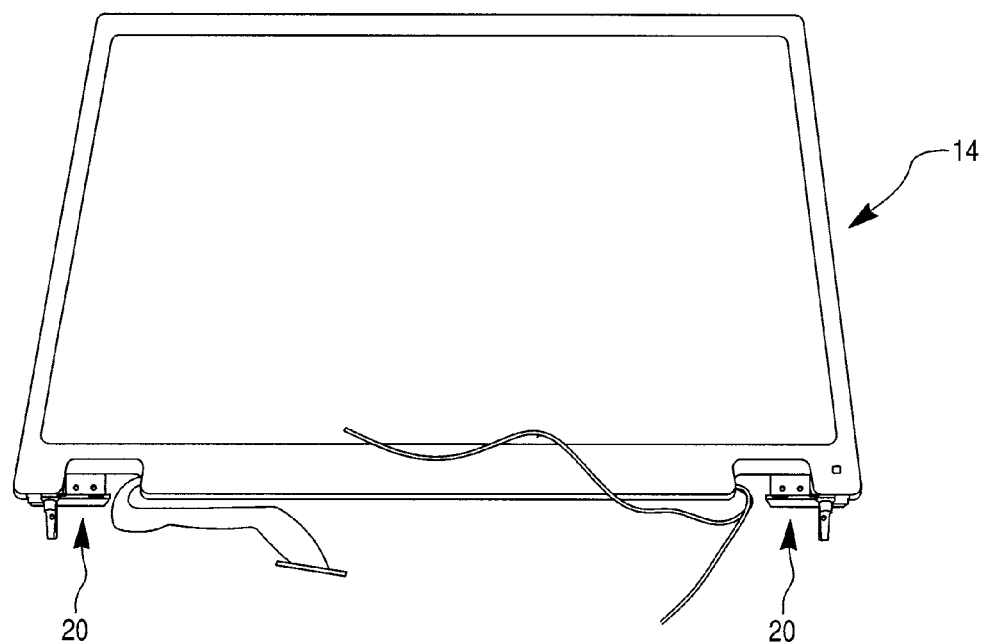
FIG. 2 is a top view of a display enclosure, according to an embodiment.

FIG. 2 is a top view of a display enclosure 14 separated from a base 12 of a notebook computer 10. As shown in the example of FIG. 2, the display enclosure can include a hinge device 20 to connect the display enclosure 14 to the base of the notebook computer.

Figure 3:
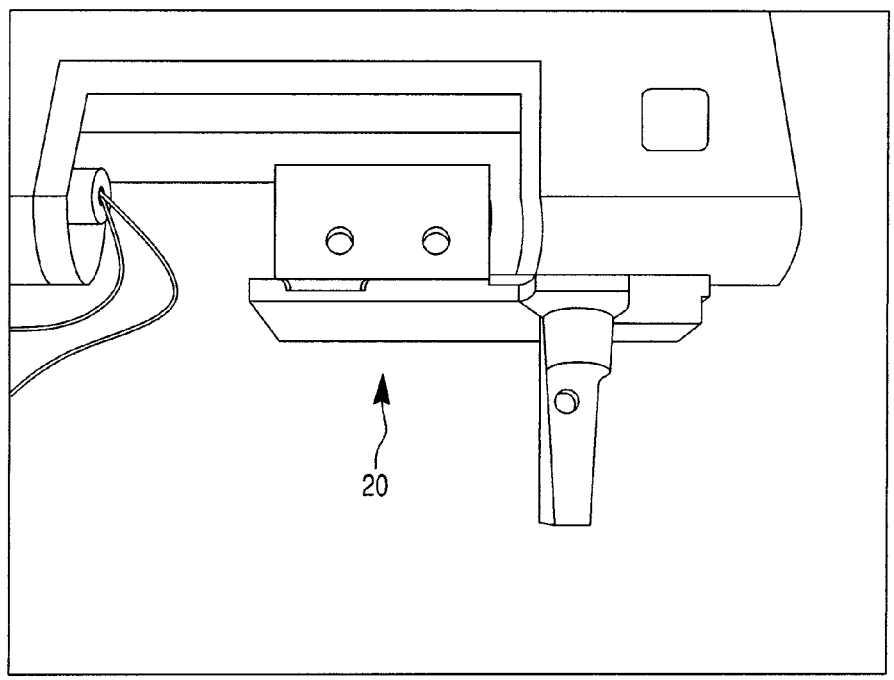
FIG. 3 is an enlarged view of the hinge device of FIG. 2.

FIG. 3 is an enlarged view of hinge device 20 of FIG. 2. Such a hinge device 20 can, for example, include a frictional device, such as a clutch or an anti-oscillation device, that provides the hinge device 20 with mechanical resistance so that the position of the display enclosure 14 can be adjusted to any desired viewing angle and maintained at that position without the display enclosure 14 falling or changing its angle.

Figure 4:
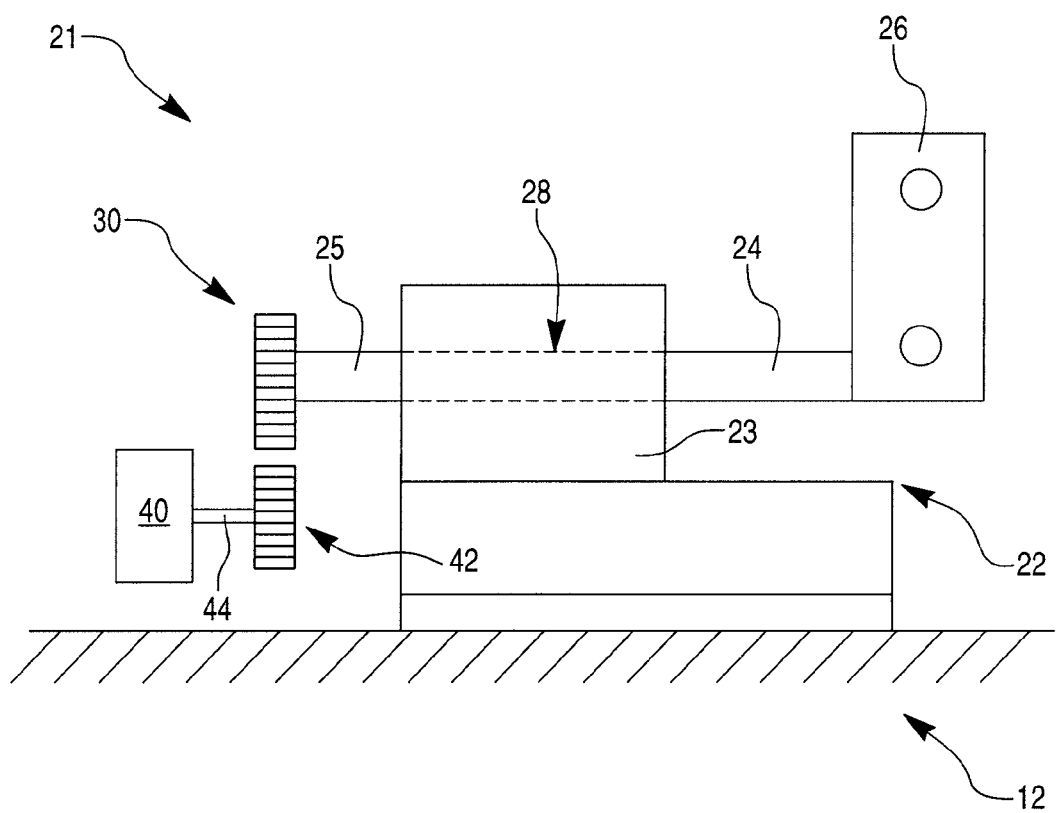
FIG. 4 is a cross-sectional view of an anti-oscillation device, according to an embodiment.

FIG. 4 is a cross-sectional view of an anti-oscillation device 21. As shown in the example of FIG. 4, an anti-oscillation device 21 can include a clutch housing 22 that is connected to the display of a notebook (not shown in FIG. 4) and to a notebook base 12. As shown in the example of FIG. 4, the clutch housing 22 can include a body 23 through which a clutch shaft 24 extends. The body 23 can be used to connect the clutch housing 22 to a notebook base 12, as shown in the example of FIG. 4. A connecting member 26 can also be provided at one end of the clutch shaft 24 to connect the clutch housing 22 to the enclosure of a display.

The clutch housing 22 can be configured to engage with the clutch shaft 24 to provide mechanical resistance so that the position of a display can be adjusted to any desired viewing angle and maintained at that position without the display and its enclosure falling or changing angle. For example, the clutch housing 22 can include a frictional device 28, such as, for example, a clutch, that engages with the clutch shaft 24 to provide the mechanical resistance.

As shown in the example of FIG. 4, the length of the clutch shaft 24 can be provided so that an extension 25 of the clutch shaft 24 extends from the body 23 of the clutch housing 22.

The anti-oscillation device 21 also includes a dampening device 40. Such a dampening device 40 can be used to reduce, minimize, or eliminate oscillations or vibrations that can be experienced when a display of a notebook computer is moved to a viewing angle. The dampening device 40 can be connected to the shaft extension 25 so that the dampening device 40 can counter oscillation or vibrations created when the display of a notebook is moved to a viewing angle. The dampening device 40 can be connected to the notebook computer, such as a base 12 of the notebook. Such a dampening device 40 can use a minimum amount of space without major changes in the design of a notebook computer and without a large additional cost.

For example, when a display of a notebook is moved to a viewing angle, forces caused by the movement of the display can be transmitted through the connecting member 26 to the clutch shaft 24. The clutch housing 22 can engage with the clutch shaft to provide mechanical resistance so that the position of the display can be adjusted to a desired viewing angle. However, the mechanical resistance provided by the clutch housing 22 can cause oscillations or vibrations that are observed by a user of the notebook computer, which cause the user to feel that the notebook is of poor quality. A dampening device 40 can be connected with an extension 25 of the clutch shaft 24 so that the dampening device can reduce, minimize, or eliminate these oscillations or vibrations. The dampening device 40 can also reduce any mechanical noise created when the display of a notebook computer is moved and positioned. In this way, the oscillations or vibrations can be countered and the user can feel that the notebook is of good quality.

The dampening device 40 can be connected to the shaft extension 25 by providing the dampening device 40 with a shaft 44 that is connected to the shaft extension 25. As shown in the example of FIG. 4, the shaft 44 of the dampening device 40 can have a first gear 42 connected to the shaft 44 and the shaft extension 25 can have a second gear 30 attached to the shaft extension 25 so that the first gear 42 and the second gear 30 are connected to, or otherwise engage with, one another, thus connecting the dampening device 40 and the shaft extension 25. According to such an example, when a display of a notebook computer is moved, the dampening device 40 can act to counter oscillations or vibrations because the dampening device 40 is connected to the clutch shaft 24 and can act to reduce, minimize, or eliminate oscillations or vibrations acting upon the clutch shaft 24, such as, for example, any oscillation or vibrations created by the engagement of the clutch housing 22 with the clutch shaft 24.

Figure 5:
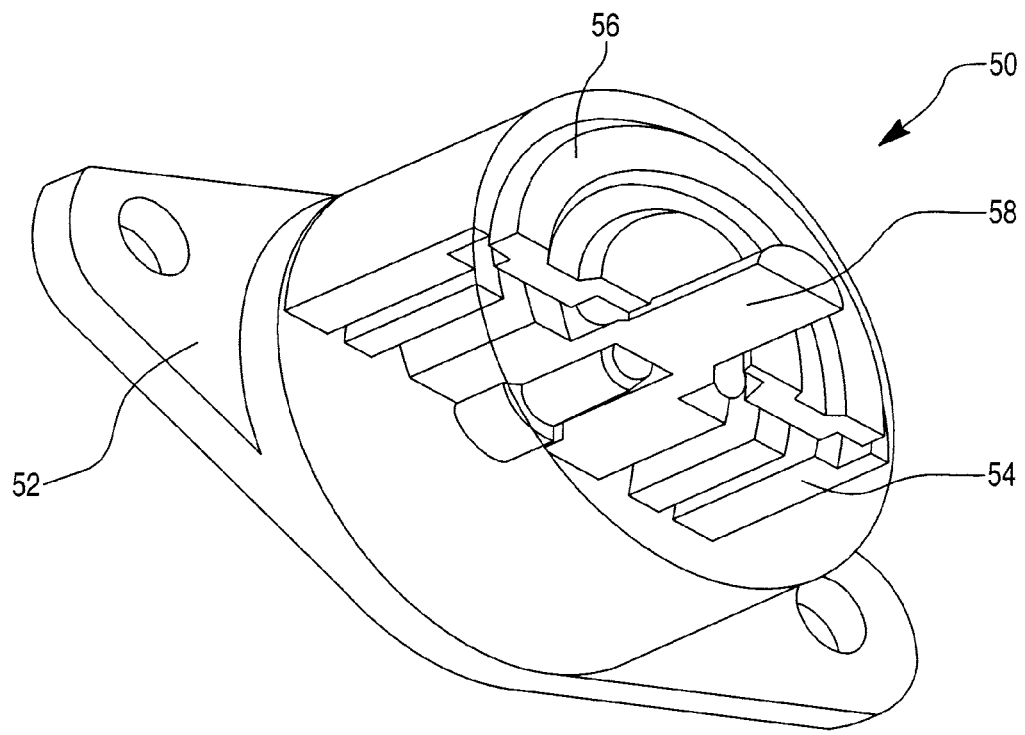
FIG. 5 is an isometric, partial cut-away view of a rotary damper, according to an embodiment.

The dampening device described herein can be, for example, a rotary damper or other dampening device used in the art. FIG. 5 provides an isometric view of an exemplary rotary damper 50. A rotary damper 50 can include a body 52, a rotor 54, and a cap 56. The rotary damper 50 can also include a shaft 58 that is connected to the rotor 54, as shown in the example of FIG. 5. Such a rotary damper 50 can include a fluid within spaces provided between the rotor 54 and the body 52. Such fluid provides resistance when the rotor 54 is moved relative to the body 52, such as when the shaft 58 is rotated, which in turn rotates the rotor 54. For example, the fluid resistance of the rotary damper 50 can provide a slow, controlled resistance to a force or torque that is transmitted through the shaft 58 of the rotary damper 50, such as, for example, a force provided by the shaft extension 25 that the rotary damper 50 can be connected to. Such fluid resistance can dampen oscillations or vibrations that are created when the display of a notebook computer is positioned. Thus, the rotary damper can provide a user of the notebook with a smooth, hydraulic feel when adjusting the position of the notebook display.

The viscosity of the fluid, the amount of space between the rotor 54 and the body 52, and the surface area of the rotor 54 and the body 52 can be designed to provide a particular amount of resistance and dampening effect produced by the rotary damper 50. Furthermore, the resistance or torque of the rotary damper 50 can be affected by temperature due to possible changes in the viscosity of the fluid. In another example, the rotary damper 50 can be arranged according to any of the rotary dampers described in ACE Controls, Inc. Rotary Dampers 2007 catalog, which is hereby incorporated by reference in its entirety.

Figure 6:
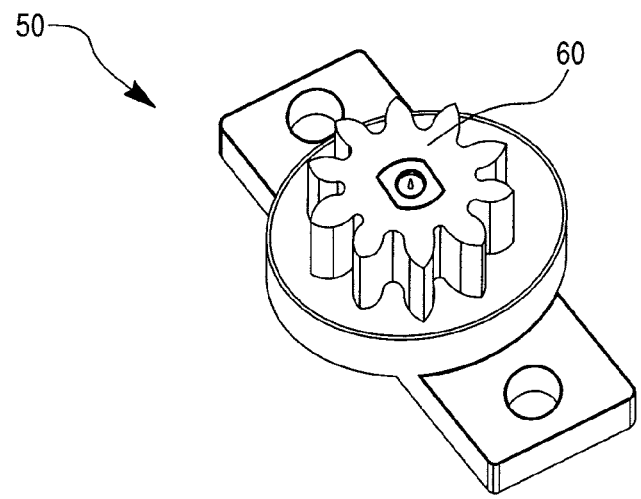
FIG. 6 is an isometric view of a rotary damper and gear, according to an embodiment.

As shown in the example of FIG. 6, a rotary damper 50 can be provided with a gear 60, which can be fixed to the shaft 58 of the rotary damper 50. Such a gear 60 can serve as the first gear 42 in the example of FIG. 4 for connecting the rotary damper 50 to the shaft extension 50 of the clutch housing 22.

Figure 7:
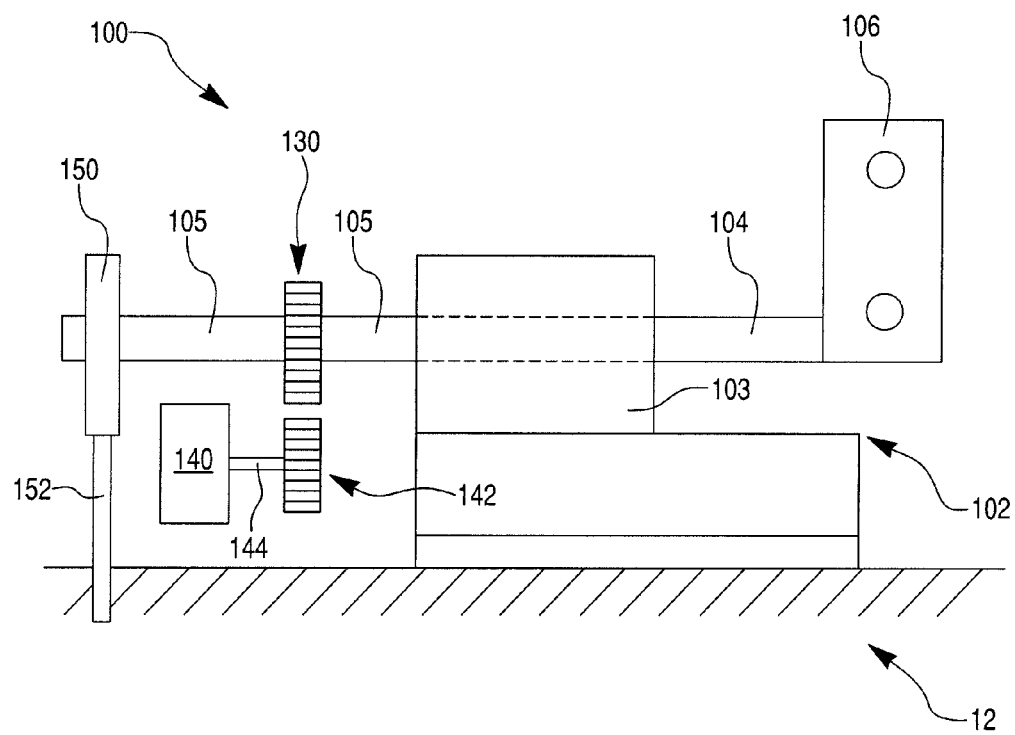
FIG. 7 is a cross-sectional view of an anti-oscillation device, according to an embodiment.

FIG. 7 shows a section view of an anti-oscillation device 100, according to another example. The anti-oscillation device 100 can include a clutch housing 102 that is connected to the display of a notebook (not shown in FIG. 7) and to a notebook base 12. As shown in the example of FIG. 7, the clutch housing 102 can include a body 103 through which a clutch shaft 104 extends. The body 103 can be used to connect the clutch housing 102 to a notebook base 12, as shown in the example of FIG. 4. A connecting member 106 can also be provided at one end of the clutch shaft 104 to connect the clutch housing 102 to the enclosure of a display. As described in regard to the example of FIG. 4, the clutch housing 102 can be configured to engage with the clutch shaft 104 to provide mechanical resistance so that the position of a display can be adjusted to any desired viewing angle and maintained at that position without the display and its enclosure falling or changing angle.

The anti-oscillation device 100 includes a dampening device 140, which can be connected to the shaft extension 105 by providing the dampening device 140 with a shaft 144 that is connected to the shaft extension 105. As shown in the example of FIG. 7, the shaft 144 of the dampening device 140 can have a first gear 142 connected to the shaft 144 and the shaft extension 105 can have a second gear 130 attached to the shaft extension 105 so that the first gear 142 and the second gear 130 are connected to, or otherwise engage with, one another, thus connecting the dampening device 140 and the shaft extension 105. According to such an example, when a display of a notebook computer is moved, the dampening device 140 can act to counter oscillations or vibrations because the dampening device 140 is connected to the clutch shaft 104 and can act to reduce, minimize, or eliminate oscillations or vibrations acting upon the clutch shaft 104, such as, for example, any oscillation or vibrations created by the engagement of the clutch housing 102 with the clutch shaft 104.

As shown in the example of FIG. 7, the anti-oscillation device 100 can include a biasing device 150. The biasing device 150 can be configured to apply a force to the shaft extension 105. Such a force provided by the biasing device 150 can be used to assist in the opening of a notebook computer, such as when a latch of the notebook computer is released and the display of the notebook is moved to an open viewing position. Therefore, the biasing device 150 can be provided to assist a user to open the display of a notebook to a viewing angle, thus permitting the user to exert less force when opening the display of the notebook computer, or to provide sufficient force to open the display of the notebook without any exertion by the user.

The biasing device 150 can be connected to the shaft extension 105 of the clutch housing 102. As shown in the example of FIG. 7, the shaft extension 105 can extend past the second gear 130 that is connected to the shaft extension 105 to the position of the biasing device 150 so that both the biasing device 150 and the dampening device 140 can be connected to the shaft extension 105. Therefore, a force provided by the biasing device 150 can also be dampened by the dampening device 140 so that any motion of the notebook display that results from the force applied by the biasing device 150 is observed by a user as a relatively smooth motion with a minimal amount of oscillations or vibrations. The biasing device 150 can be connected to the notebook computer, such as the base 12 of the notebook. For example, the biasing device 150 can include an end or portion 152 that is connected to the base 12, as shown in FIG. 7.

Figure 8:
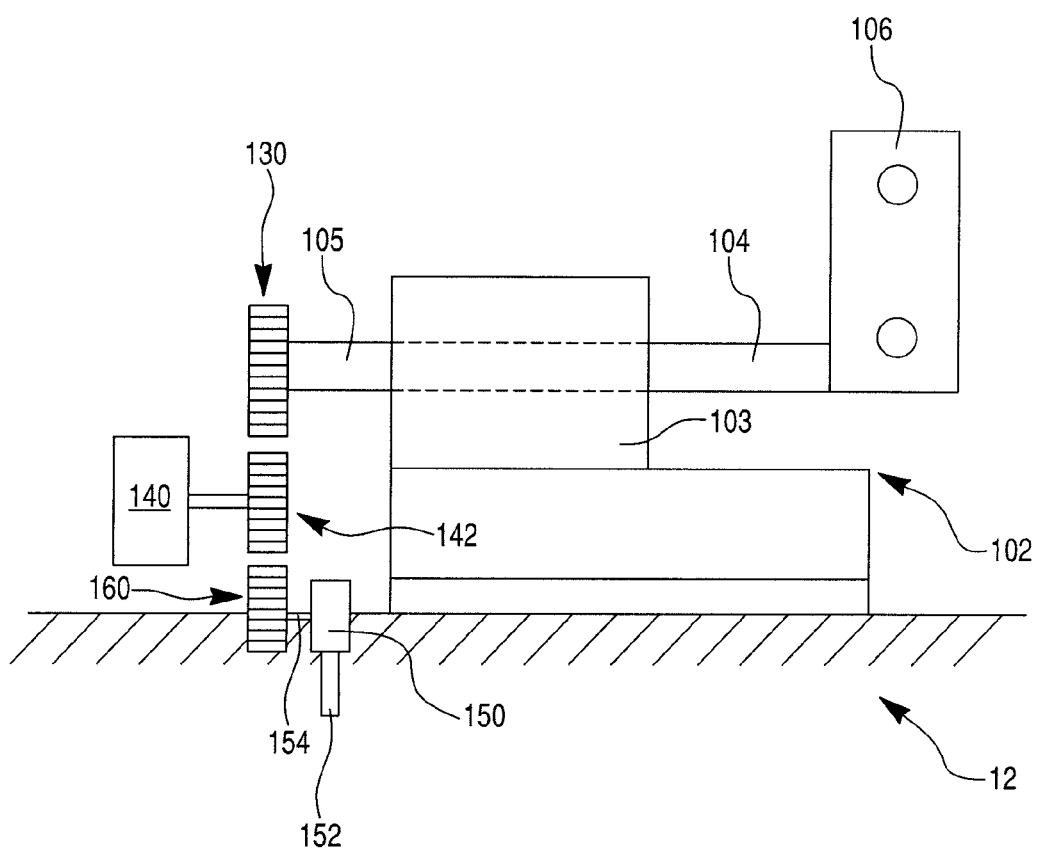
FIG. 8 is a cross-sectional view of an anti-oscillation device, according to an embodiment.

FIG. 8 is a sectional view of an anti-oscillation device 100 similar to the anti-oscillation device 100 of FIG. 7. However, in the example of FIG. 8 the biasing device 150 is not directly connected to the shaft extension 105 of the clutch housing 102. Instead, the biasing device 150 can be connected to the dampening device 140. For example, the biasing device 150 can include a shaft 154 and a gear 160 that is in turn connected to the first gear 142 of the dampening device 140, as shown in FIG. 8. Therefore, a force provided by the biasing device 150 can be transmitted to the dampening device 140, which in turn dampens any oscillations or vibrations produced by the biasing device 150 itself, and the dampened force can then in turn be transmitted to the shaft extension 105 of the clutch housing 102 to assist a user in a relatively smooth movement of the notebook display. The biasing device 150 can be connected to the notebook computer, such as the base 12 of the notebook, as shown in the example of FIG. 8. For example, the biasing device 150 can be connected to the notebook computer via an end or portion 152.

Figure 9:
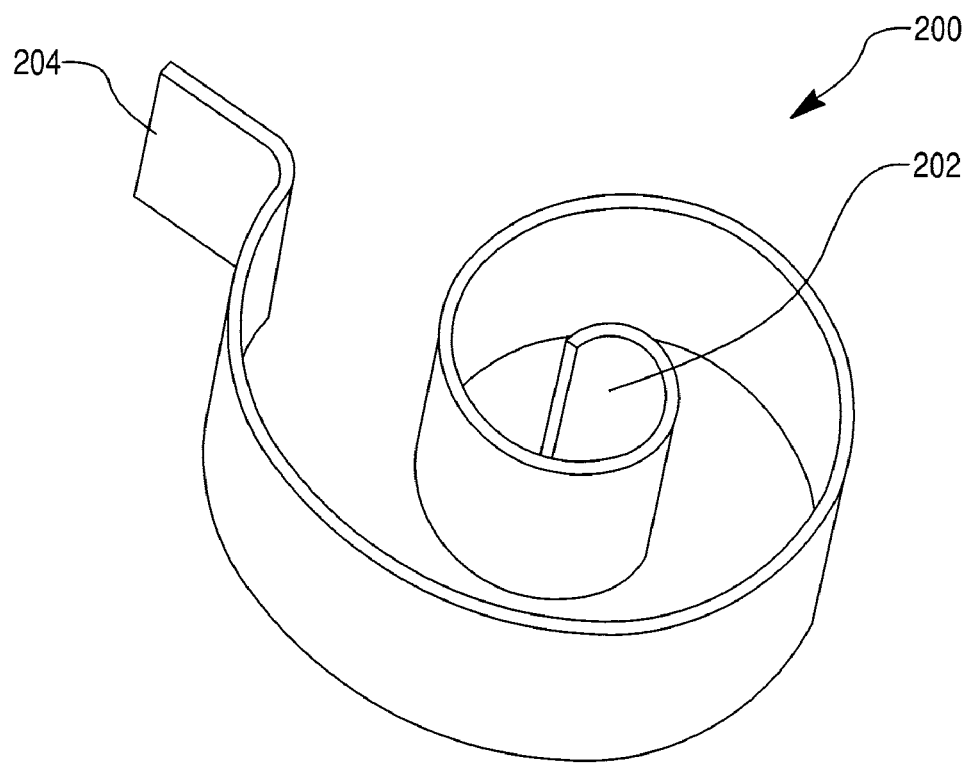
FIG. 9 is an isometric view of a clock spring, according to an embodiment.

The biasing devices described herein can be, for example, a spring, such as clock spring, or other force-providing devices used in the art. FIG. 9 shows an example of a clock spring 200 that can be used as a biasing device for the examples described herein. The clock spring 200 can include a first end 202 and a second end 204, as shown in FIG. 9. The first end 202, for example, can be configured to be attached to a shaft extension 105, as shown in the example of FIG. 7, or can be configured to be attached to a shaft 154, as shown in the example of FIG. 8, so that when the clock spring 200 is released or unwound the clock spring 200 applies a force to the shaft extension 105 or to the shaft 154. Furthermore, the second end 204, for example, can be configured to be attached to the notebook computer, such as the base 12 in the examples of FIGS. 7 and 8, in order to fix the position of the clock spring 200 relative to the notebook computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other embodiments of the invention will be apparent to those skilled in the art from consideration of the specification and practice of the invention disclosed herein.

What is claimed is:

1. An anti-oscillation device for a notebook display, comprising:
    a clutch housing configured to be connected to the display of the notebook and to a base of the notebook, wherein the clutch housing includes a body and a shaft extension that extends from the body, and
    a dampening device connected to the shaft extension, wherein the dampening device includes a shaft that is connected to the shaft extension of the clutch housing.

2. The anti-oscillation device of claim 1, wherein the dampening device includes a first gear connected to the shaft of the dampening device and the clutch housing includes a second gear connected to the shaft extension of the clutch housing,
    wherein the first gear and the second gear are connected to one another.

3. The anti-oscillation device of claim 1, wherein the dampening device is a rotary dampener.

4. The anti-oscillation device of claim 1, further comprising a biasing device configured to apply a force to the shaft extension of the clutch housing.

5. The anti-oscillation device of claim 4, wherein the biasing device is connected to the shaft extension of the clutch housing.

6. The anti-oscillation device of claim 4, wherein the biasing device is connected to the dampening device.

7. The anti-oscillation device of claim 4, wherein the biasing device is a spring.

8. The anti-oscillation device of claim 6,
    wherein the dampening device includes a first gear connected to the shaft of the dampening device and the clutch housing includes a second gear connected to the shaft extension of the clutch housing,
    wherein the first gear and the second gear are connected to one another,
    wherein the biasing device includes a third gear connected to the second gear.

9. A notebook computer, comprising:
    a base and a display, and
    an anti-oscillation device, comprising:
    a clutch housing configured to be connected to the display of the notebook and to the base of the notebook, wherein the clutch housing includes a body and a shaft extension that extends from the body, and
    a dampening device connected to the shaft extension, wherein the dampening device includes a shaft that is connected to the shaft extension of the clutch housing.

10. The notebook computer of claim 9, wherein the dampening device includes a gear connected to the shaft extension of the clutch housing, the gear counters vibrations created on the shaft extension of the clutch housing when the display moves to a viewing angle.

* * * * *